United States Patent [19]
Martini et al.

[11] Patent Number: 5,283,881
[45] Date of Patent: Feb. 1, 1994

[54] MICROCOPROCESSOR, MEMORY MANAGEMENT UNIT INTERFACE TO SUPPORT ONE OR MORE COPROCESSORS

[75] Inventors: William J. Martini, Ellicott City; Thomas J. Neufelder, Pasadena; Joel E. Lawhon, Catonsville; Robert F. Eyler, Glen Burnie, all of Md.

[73] Assignee: Westinghouse Electric Corp., Pittsburgh, Pa.

[21] Appl. No.: 643,624

[22] Filed: Jan. 22, 1991

[51] Int. Cl.$^5$ .............................. G06F 13/12
[52] U.S. Cl. ...................... 395/425; 364/DIG. 1
[58] Field of Search ... 364/200 MS File, 900 MS File; 395/400 MS File, 425 MS File

[56] References Cited

U.S. PATENT DOCUMENTS

| | | | |
|---|---|---|---|
| 4,384,340 | 5/1983 | Tague et al. | 395/375 |
| 4,598,365 | 7/1986 | Boothroyd et al. | 395/375 |
| 4,766,537 | 8/1988 | Zolnowsky | 395/425 |
| 4,868,738 | 9/1989 | Kish et al. | 395/400 |
| 4,875,160 | 10/1989 | Brown, III | 395/375 |
| 5,016,161 | 5/1991 | Van Loo et al. | 395/575 |
| 5,038,282 | 8/1991 | Gilbert et al. | 395/200 |
| 5,041,969 | 8/1991 | Kawasaki et al. | 395/375 |
| 5,109,514 | 4/1992 | Garner et al. | 395/800 |

*Primary Examiner*—Joseph L. Dixon
*Assistant Examiner*—Reba I. Elmore

[57] ABSTRACT

The invention comprises an interface for switching control of a memory management unit (MMU) between a central processing unit (CPU) having a register stack for storing data, and one or more coprocessors (COP) each having register stacks for storing data. The COP is operative when actuated to perform selected functions, not normally performed by the CPU, utilizing information in memory.

7 Claims, 7 Drawing Sheets

MICROCOPROCESSOR, MEMORY MANAGEMENT UNIT INTERFACE TO SUPPORT ONE OR MORE COPROCESSORS

BACKGROUND OF THE INVENTION

1. Field of the Invention

The invention relates to an interface between a central processing unit (CPU) e.g., microprocessor and one or more coprocessors. In particular, the invention relates to a method and apparatus for allowing the execution of special purpose functions by a coprocessor which rapidly assumes control of the processor busses and is conditioned to be immediately available to perform the special purpose function.

2. Description of the Prior Art

Existing computer instruction sets are often inadequate for specific purposes. An instruction set may only need the addition of a few instructions to significantly enhance the processing capability for a particular application. One way to increase the instruction set is to redesign the central processing unit (CPU) which would be very costly and time consuming. Another more practical approach has been to add a coprocessor which extends the instruction set. In such an arrangement, the critical link is the interface between the CPU and the coprocessor. Many interfaces have been designed but they are limited in their capabilities because they cannot manipulate memory and require transfer of data between the CPU and coprocessor to provide operands for execution. Both of these operations require time. In the first instance time is lost in controlling memory through the CPU which is not involved in performing the specific instruction. In the second instance time is required to set up the coprocessor prior to execution of the function.

SUMMARY OF THE INVENTION

The invention comprises an interface for switching control of a memory management unit (MMU) between processors including a central processing unit (CPU) and one or more coprocessors (COP) each having a register stack for storing common data. A memory retrievably stores information in selected address locations for use by the CPU and the MMU is normally responsive to the CPU for controlling the exchange of information between memory and the CPU. The COP is operative when actuated to execute selected functions not normally performed by the CPU utilizing information in memory.

In one such an arrangement, the invention comprises means for monitoring the CPU register stack and updating the COP register stack in accordance with concurrent changes in the CPU register stack, such that, each COP register stack has currently stored therein data sufficient to allow the COP to immediately assume control of the MMU in response to a command without reloading the COP register stack with current information. Means is provided for enabling any one of the COPs to control the MMU immediately in response to instruction opcodes, and means is further provided for passing control between the CPU and any COP in response to the opcodes.

In accordance with the invention there is provided a constant update of all the register stacks and each COP is configured to manipulate memory by controlling the MMU in the same way as the CPU. These two features allow a rapid switch from the CPU to the COP thereby allowing the maximum flexibility in system execution.

DESCRIPTION OF THE PREFERRED EMBODIMENT

Figure 1:
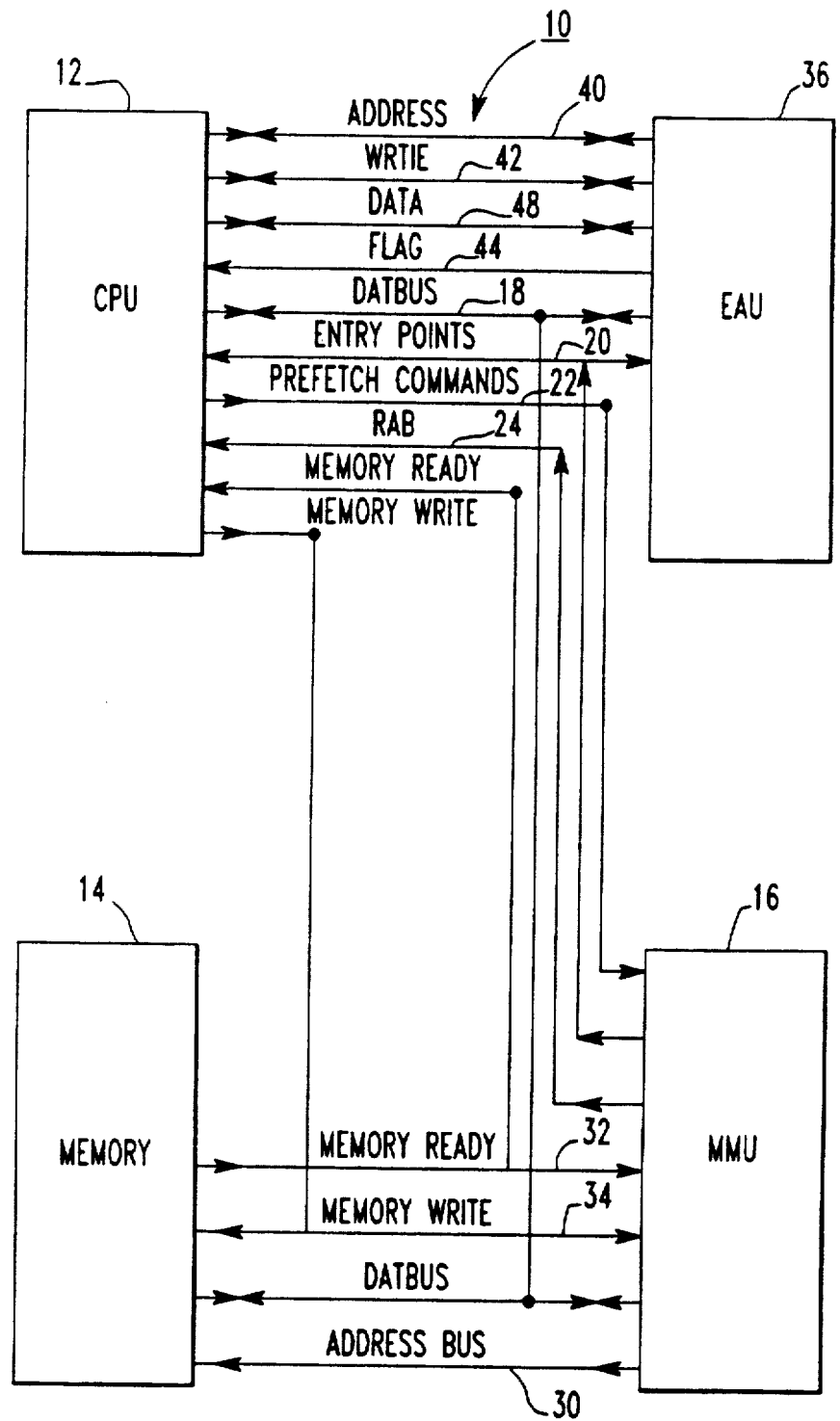
FIG. 1 is a schematic illustration of a known arrangement employing a central processing unit (CPU) having a memory and a memory management unit (MMU) controlled by the CPU and an optional extended arithmetic unit (EAU)

Before proceeding with the description of the implementation of the present invention, reference is directed to FIG. 1 which is a schematic block diagram of a known arrangement of system 10 which employs a central processing unit (CPU) 12 employing a processor 72 (FIG. 3), a memory 14 and a memory management unit (MMU) 16 which is controlled by the CPU 12 and which manages the flow of information between the CPU 12 and the memory 14. The CPU 12, the memory 14 and the MMU 16 are coupled together on a common bidirectional data bus 18. The MMU 16 provides instruction and entry points to the CPU on entry point bus 20. An entry point 20 can be considered as a signal that a particular function is to be executed. Upon receipt of an entry point input the CPU 12 provides prefetch commands to the MMU on prefetch command lines 22. Prefetch commands direct the MMU as to how to step through actual address calculation states. In other words the prefetch commands are instructions to the MMU as to what addressing modes will be employed to fetch operands for the instruction. Along with the entry point, the MMU 16 provides a register select output on register bus (RAB) 24 which provides correct address information for time multiplexed two port register fields A and B in the CPU 12. That is, after having determined which operands are to be manipulated in response to instruction opcodes, the MMU 16 provides register locations for such operands on the RAB bus 24. Although in the embodiment described herein, a two port register stack (not shown) is employed, a multi-port system employing more than two ports may be provided. During execution, the data bus 18 carries instructions, operand address information and data to and from the CPU 12, the memory 14 and the MMU 16. In response to an appropriate signal on the data bus 18 the MMU 16 selects an address in memory 14 by means of the address bus 30. In response, when the memory 14 is properly configured it produces a memory ready output on memory ready line 32. During a store operation the CPU 12 initiates a memory write signal on memory write line 34 which allows data on the bus 18 to be transferred to memory 14.

Optional extended arithmetic unit (EAU) 36 may be employed to execute on an expedited basis complex arithmetic functions. The EAU 36 is coupled to the CPU 12 over the data bus 20 and EAU monitors its entry point over line 20. Communication between the CPU 12 and the EAU 36 is further implemented by EAU data bus 38 over which the CPU 12 communicates information stored in its register stack to thereby enable the EAU 36 to perform the desired function.

The EAU address bus 40 allows the CPU 12 to locate addresses in each register stack (not shown) for the register data. The EAU write bus 42 enables EAU register stack to receive the data. The EAU flag 44 signals the CPU 12 that an entry point for the EAU function has been detected and that the EAU 36 is available to perform special functions.

The EAU 36 receives information only from the CPU 12. The EAU 36 does not communicate directly with the MMU 16 or the memory 14. When data is required for implementation by the EAU 36, the CPU 12 provides the information exclusively. This arrangement has some inherent limitations as discussed above inasmuch as the CPU 12 remains in control of the stepwise functioning of the MMU 16 and thus does not allow the EAU 36 the flexibility which would be available if it were available for independent implementation of its function.

Figure 2:
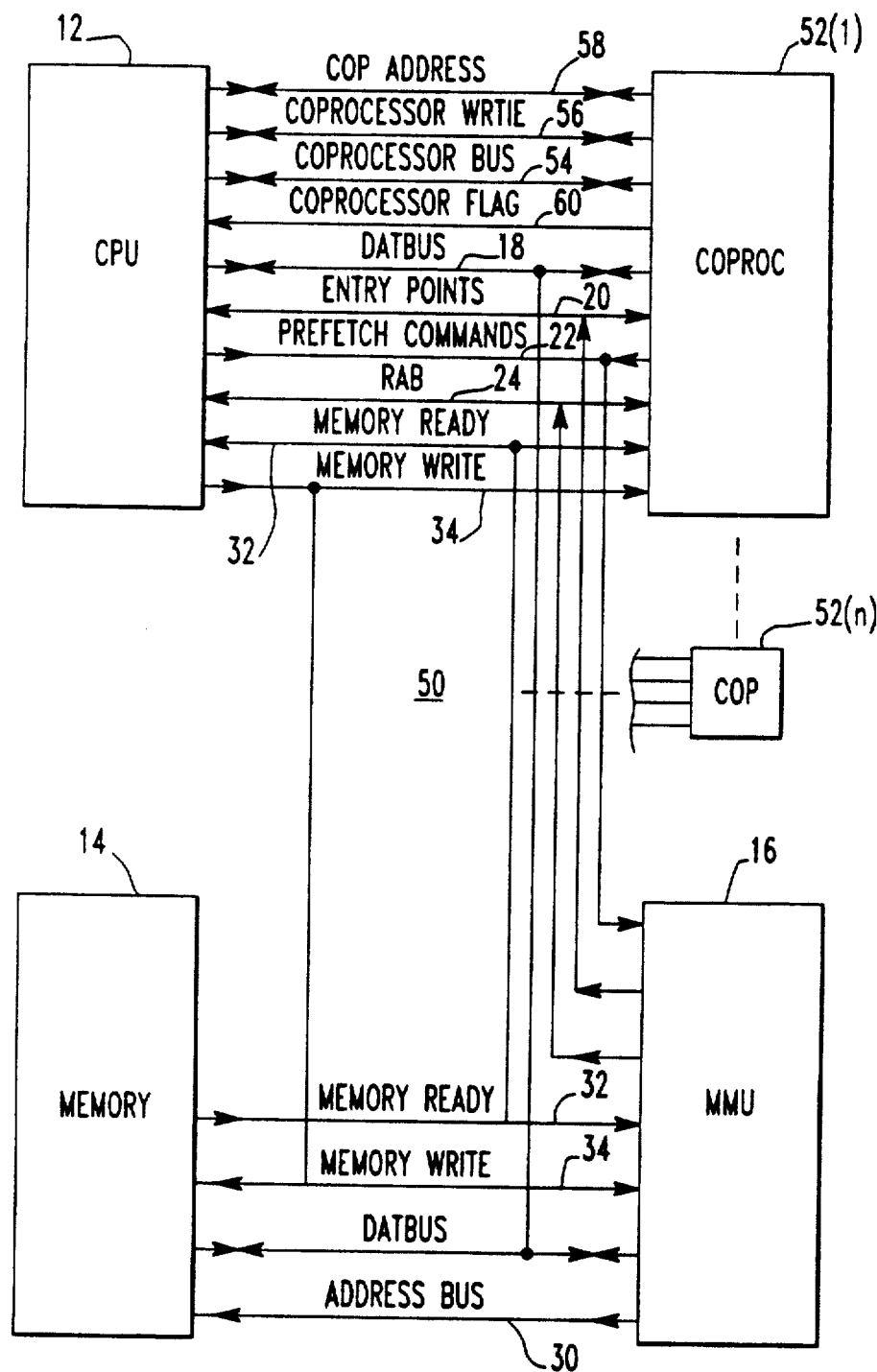
FIG. 2 is a schematic diagram of the arrangement of the present invention employing a coprocessor (COP) and an interface adapted for use in the arrangement of FIG. 1.

Referring to FIG. 2 in which similar elements have been labeled with the same reference numerals as FIG. 1 there is illustrated a system 50 employing a CPU 12, memory 14, MMU 16 and one or more coprocessors (COP) 52(1)-52(N). In referring to coprocessors the reference numeral 52 is used hereinafter to refer to single or plural coprocessors unless a particular coprocessor is designated. In the arrangement of FIG. 2 the previously described bidirectional data bus 18 as well as the entry point bus 20, the prefetch command bus 22, the RAB bus 24, the memory ready line 32 and the memory write line 34 are coupled to the COP 52 which lines function in the same manner as described earlier. In the arrangement illustrated in FIG. 2, however, the COP 52 is coupled to the CPU 12 by additional lines including a bidirectional coprocessor data bus 54.

Figure 3:
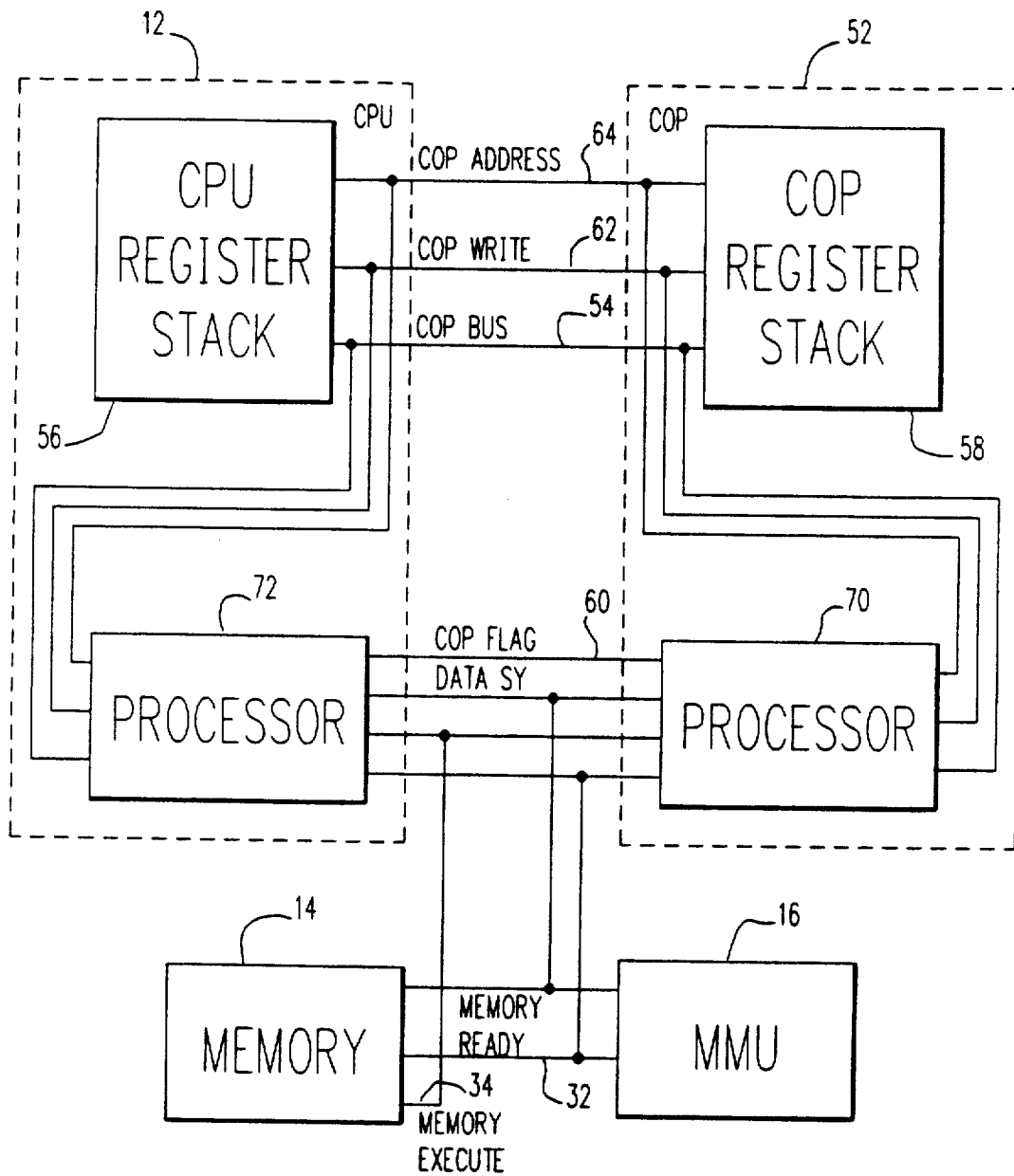
FIG. 3 is a schematic diagram illustrating communication between register stacks for the CPU and COP.

The coprocessor data bus 54 feature, shown in greater detail in FIG. 3, is employed to transfer data from the CPU register stack 56 into the corresponding COP register stack 58 on a constantly updated basis so that each COP 52 has the same register data as the CPU 12. The coprocessor data bus 54 is bidirectional because in those instances in which the COP 52 is in control of the system, as hereinafter described, the CPU register stack 56 is constantly updated in the other direction. A coprocessor write line 62 carries signals for implementing write commands to the CPU and COP register stacks 56 and 58. The coprocessor address bus 64 provides a communication function for addressing the stacks 56 and 58. A coprocessor flag line 60 carries a signal to the processor 72 of CPU 12 that the COP 52 has a function to execute and that it will assume control for that instruction. The flag further alerts the CPU 12 when the processor 56 of COP 52 has finished executing the function.

According to the invention during the execution of any particular function, the CPU 12 and each COP 52 essentially operate in the same way with respect to memory 14 and the MMU 16. However, during certain portions of the operation of the system 50, the COP 52 and the CPU 12 communicate on a different level having to do with control priority as hereinafter described.

In accordance with the invention the one or more COPs 52(1)-52(N) are added to the system in order to perform such tasks as built-in functions (BIFs). For example COP 52(1) may be programmed to perform a complex mathematical function; and COP 52(2) may perform a special storage functions. Likewise two coprocessors 52(3) and 52(4) may combine to provide additional functions and so on. The arrangement of the present invention handles multiple coprocessors with no additional support logic. Data coherence is maintained through the use of the duplicate register stacks 58 in each COP 52(1)-52(N) thereby eliminating the time required to transfer instructions, commands, data and information prior to function execution. Because of the implementation arrangement described, any type of operation may be synthesized including memory to memory functions.

The execution of a particular BIF is to be performed by one or more COPs 52. However, because of the application specific nature of BIFs, no detailed description is made to as to how the functions are to be executed. It is only necessary to describe the interface requirements of the executing COP 52 with respect to the rest of the system. It is important to provide the capabilities to give the COP 52 as much control of the system 50 as possible.

For function execution, the COP 52 employs and is interfaced by means of its processor 70 directly with the MMU 16, the processor 72 of the CPU 12 and the memory 14 as well as any other coprocessors. In the preferred embodiment the COP 52 follows the entry points provided by the MMU 16 on the entry points line 20 until the entry point for a BIF is present. The MMU 16 monitors the prefetch command line 22 and determines the end of an instruction time in order to start execution of the BIF on the next clock signal. In addition to providing entry point information, the MMU 16 provides the select output on RAB line 24 for correct latching of the time multiplexed register fields 58 of the COP 52.

During the first cycle of a BIF instruction, the MMU 16 communicates the BIF operations code or opcode on the data bus line 18. During the next cycle, the COP 52 compares the BIF opcode to those which it is to execute. If a match exists, the COP 52 activates the coprocessor flag 66 on the next cycle. On the next following cycle, the CPU 12 performs a check on the latched coprocessor flag to determine if the BIF is supported. That is, the CPU 12 looks for the coprocessor flag. If the CPU 12 does not recognize the code, the CPU 12 produces a set fault prefetch command on line 22 and sets an illegal instruction fault which allows the CPU 12 to perform the next sequence of instructions as if no COP 52 were present. However, if the flag is properly active, the CPU 12 produces a prefetch command on the next cycle which is a command to switch control of the MMU 16 from the CPU 14 to the COP 52. During the next clock cycle, the MMU 16 goes to a transition state which allows the CPU 12 to deactivate its prefetch command control while the COP 52 assumes control responsibility.

From the next clock on, the COP 52 has complete control of the MMU 16 and can cause it to execute memory and/or input/output (I/O) cycles as necessary. The COP 52 requires the prefetch commands to step the MMU 16 through the states available to execute the memory 14 in the same fashion as the CPU 12. In an embodiment of the invention, one of the register fields, e.g., register field B in the opcode word may contain a source or address register location. This register can then be passed to the MMU 16 much the same as an index register. If the memory 14 is not to be accessed, COP 52 provides a hold command to maintain the state of the MMU 16.

When the COP 52 has finished its execution, it passes results and control from its processor 70 back to the processor 72 of CPU 12 by strobing the coprocessor flag line 60. After having maintained the active status of the flag, the COP 52 releases the flag for one cycle. This indicates that a result transfer will commence on the next clock cycle. The information or data words consist of a destination register address, a status and overflow. In response, the CPU 12 sets up the register address, loads the status and stores the overflow information. If, after releasing the coprocessor flag 60 for one cycle the COP 52 does not reactivate, no data results are transferred. However, if the coprocessor flag 60 is reactivated indicating a data transfer requirement, the COP 52 indicates the number of data words returned by holding the coprocessor flag 60 active on an equal number of clock cycles. The first data word is transferred immediately after the status word and it is placed in a destination register in stack 58, the CPU 12 then increments the register address and continues to do so until all the results are returned. Other than memory limitations in hardware there is no limit on the number words to be returned. The COP 52 then indicates the end of the return by releasing the coprocessor flag 60 on the next cycle before the last data word. The COP 52 also releases the MMU 16 by issuing a resume instruction prefetch command on line 22 during the cycle in which it passes over the destination register.

While executing the BIF, the COP 52 is responsible for maintaining the register stacks 58 of any other coprocessors and the register stack 56 of CPU 12. This is accomplished by the release of the coprocessor register address line 64 and coprocessor write line 56 at the same time that the COP 52 switches control of the prefetch command lines. When transferring results to the CPU 12, the COP 52 places the destination register in stack 58 on the coprocessor address bus 64 and activates the coprocessor write line 62 on the cycle before each word is placed on the coprocessor bus 54. Likewise, when not executing, the COP 52 monitors these lines to update its own stack 58.

In accordance with the invention, it is important to design the control for the coprocessor flag so that the coprocessor flag line 60 is kept free from spiking to ensure that a coprocessor is not incorrectly recognized. Also, when the BIF is completed the COP 52 must release the coprocessor flag line 60. This should not be done by relying on the deactivation of a tristate control and a subsequent signal rise through a pull up. Rather the signal should preferably be actively driven high for at least one clock before the control is removed.

The BIF instruction is diagramed below.

| 1 | | 7 8 | | 11 12 | | 15 |
|---|---|---|---|---|---|---|
| | (4F) | | (RA) | | (RB) | |
| 1 | | 7 8 | | | | 15 |
| | (opcode) | | (spare) | | | |

The first word contains a 4F hex code in the upper 8 bits with a first register field (RA) and a second register field (RB) in bits 8-11 and 12-15, respectively. It is recommended that the RA field contains the destination register and the RB field is used as an address register. However, this is not absolutely required. The second word contains the BIF opcodes in the upper 8 bits. The lower 8 bits are undefined (spare) and can be used as appropriate.

After the COP 52 has completed execution, the CPU 12 tests for an overflow condition. If an overflow condition is present, the CPU 12 tests the information passed with the status bits to determine the type of overflow. After the type of the overflow has been determined, the CPU sends the appropriate prefetch command to set the correct bits of the pending register.

Figure 4A:
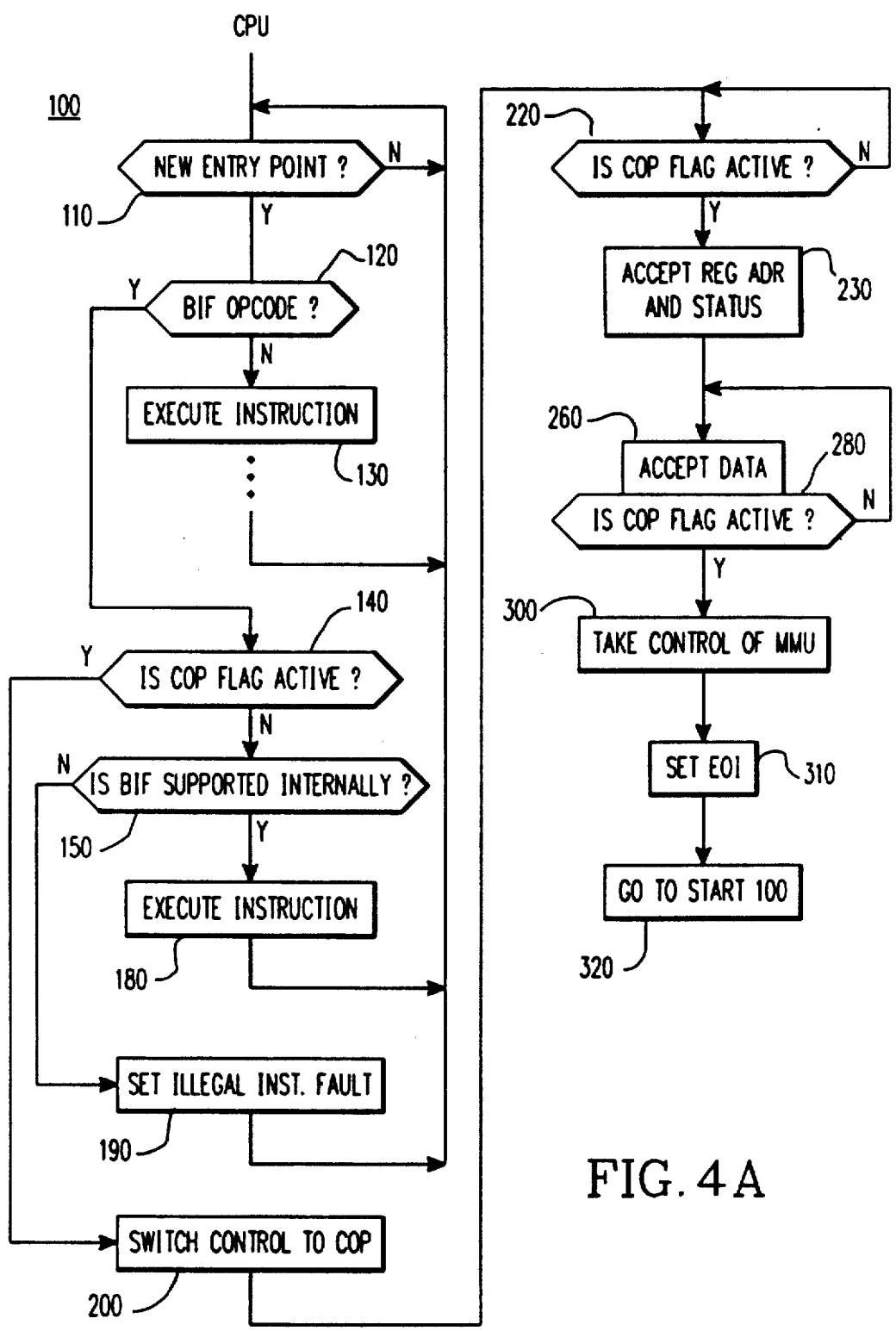
FIGS. 4A–4D are flow charts illustrating the implementation of the invention described in FIG. 3.
Figure 4B:
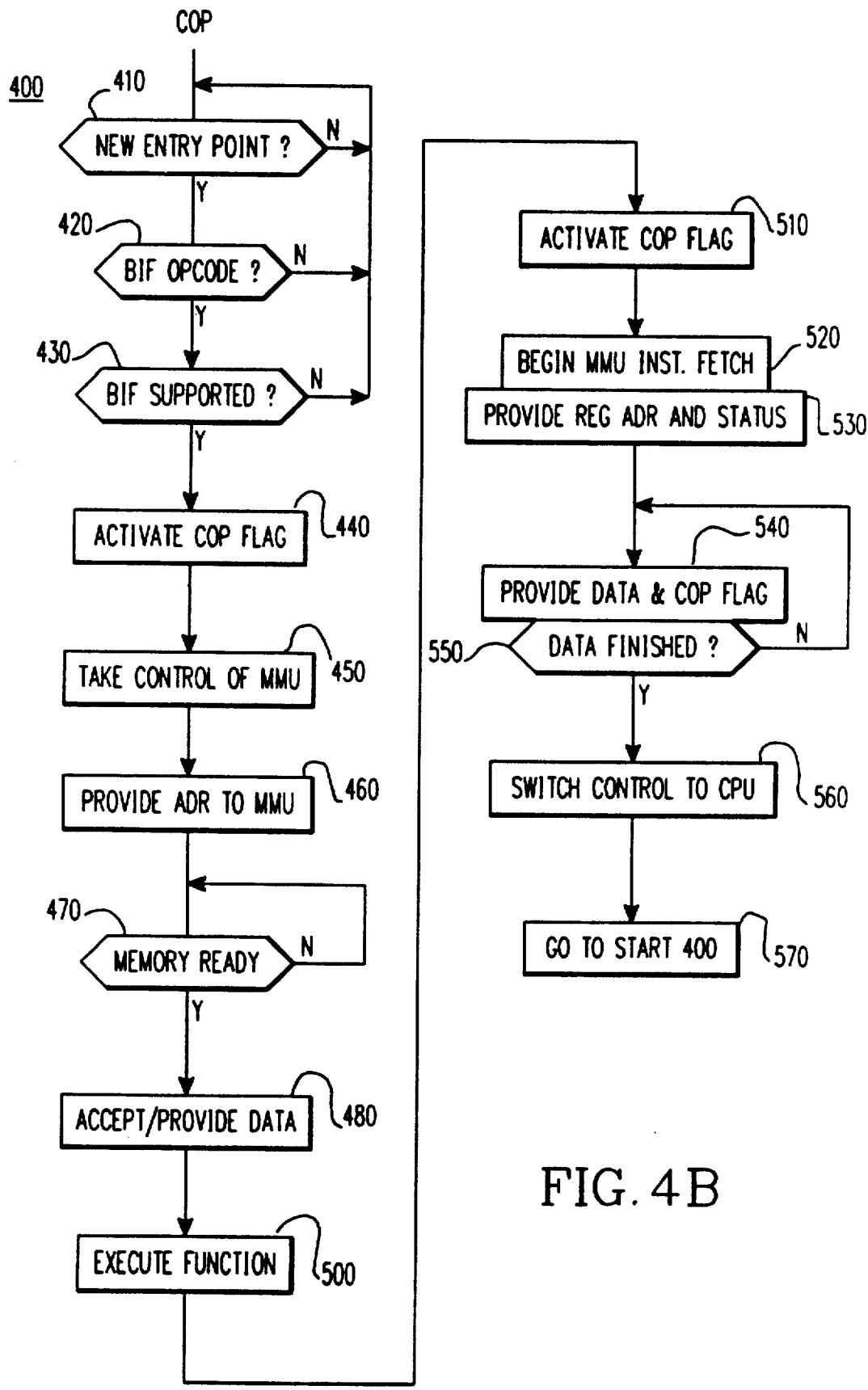
Figure 4C:
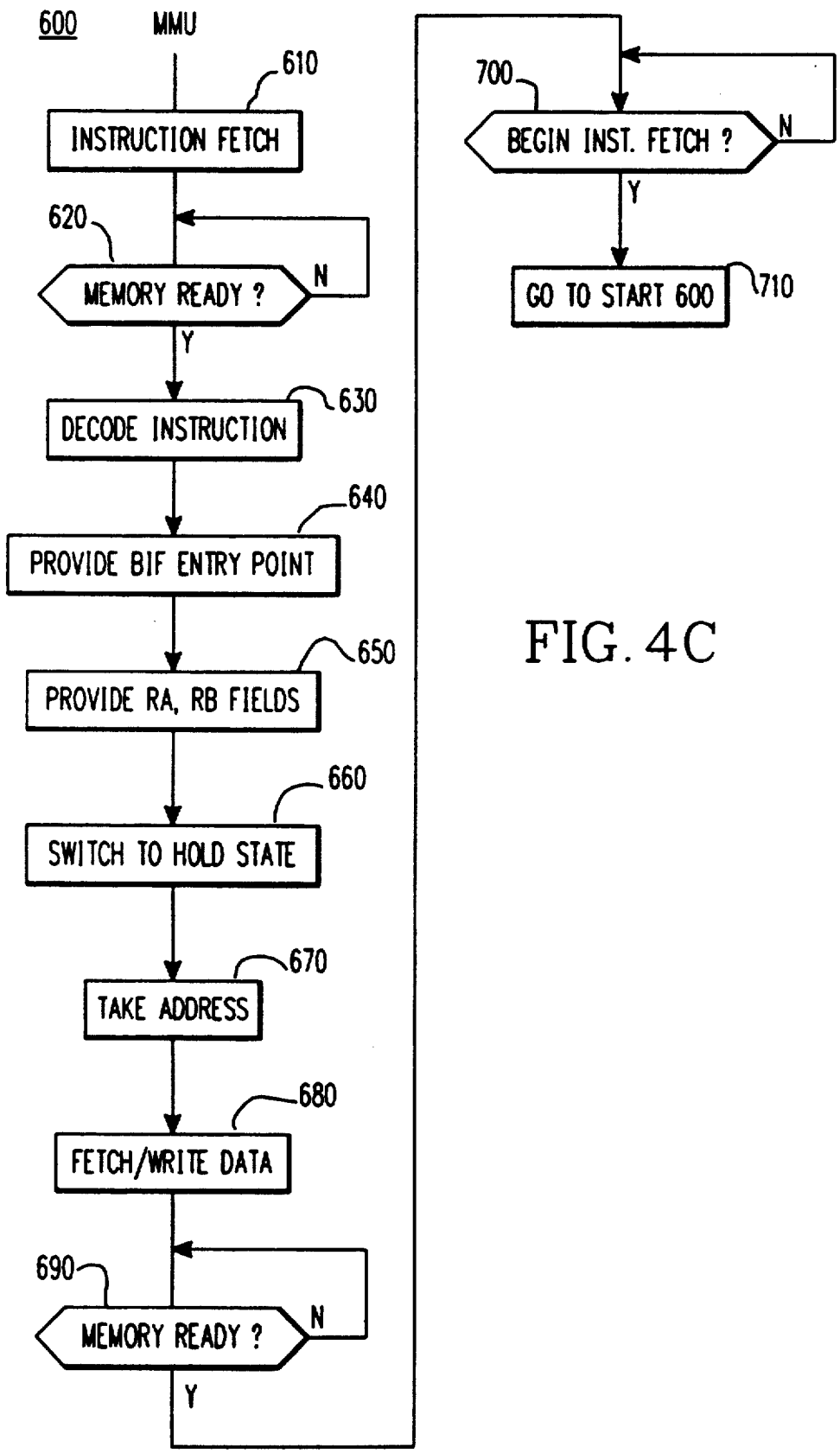
Figure 4D:
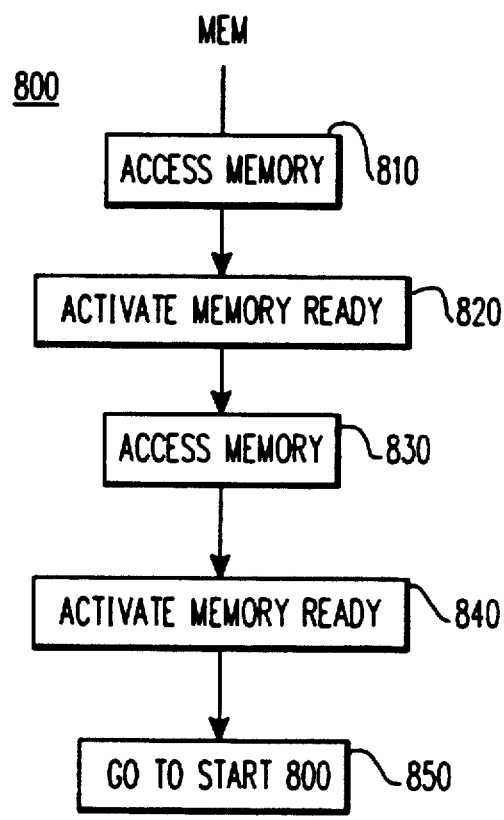

FIGS. 4A-4D are flow charts illustrating implementation of the various functions associated with the transfer of control between the CPU 12 and any one of the COP units 52(1)-52(N). In the drawing, one column each 100 (FIG. 4A), 400 (FIG. 4B), 600 (FIG. 4C), and 800 (FIG. 4D) is devoted to the operations of the CPU 12, the COP 52, the MMU 16 and the memory 14, respectively. The charts are interdependent in that some functions in a column follow functions in another. During the discussion of FIGS. 4A-4D, reference will be made to FIG. 2 as necessary. In each case, the operation is begun in column 600 with an Instruction Fetch 610 at the MMU 16 (FIG. 4C). The CPU 12 (FIG. 4A) and the COP 52 (FIG. 4B) make a New Entry Point ? inquiry at respective blocks 110 and 410. In response to the affirmative both make respective BIF Opcode ? inquiries at 120 and 420 (FIGS. 4A and 4B). If the entry point is not a BIF opcode the CPU executes the instruction at 130 and returns to the head of the column 100 in FIG. 4A. If the BIF opcode is present an Is COP Flag Active ? inquiry is made at decision block 140. An affirmative response causes the CPU to switch control to the COP at 200 if the BIF is supported in the COP. If the BIF is supported in BIF Supported ? inquiry block 430 (FIG. 4B), the COP flag is activated in block 440 and the COP takes control of the MMU at block 450. Thereafter, the COP provides an address to the MMU at block 460. In the case of an affirmative, Memory Ready ? inquiry at 470 the COP with Accept or Provide Data at block 480 to the designated addresses and will Execute Function at 500 utilizing the data. Upon completion of the execution of the function the COP activates the COP flag at 510. Thereafter, Begin MMU Instruction Fetch block 520 enables the MMU to fetch the next instruction. The Provide Register Address and Status block 530 enables the COP to provide data resulting from the execution of the BIF to the CPU. Thereafter, the COP 52 operates Provide Data and Coprocessor Flag at block 540 and loops the sequence by means of the Data Finished ? inquiry block 550. When data is finished, the COP operates Switch Control to CPU at block 560 and returns to the start or head of column 400 at block 570.

If the COP has taken control as described and executed the BIF, some time later control will be passed back to the CPU. This occurs due to COP Flag Active ? decision block 220 (FIG. 4A) as a result of Activate COP Flag 510 in column 400 (FIG. 4B). Thereafter Accept Register Address and Status block 230 takes the address provided by Provide Register and Address Status block 530 in column 400. Thereafter CPU then accepts the data provided by Provide Data and COP Flag block 540 at block 260. The COP Flag Active ? decision block 280 loops the sequence until COP flag becomes inactive in which case the CPU reacquires control of the MMU at block 300, Sets End of Instruction (EOI) at block 310 and goes to the start of the column 100 at block 320.

Returning to inquiry block 140 in column 100, if the COP Flag ? is inactive, decision block 150 inquires Is BIF Supported Internally ?. If it is not the Set Illegal Instruction Fault block 190 restarts the sequence as shown (FIG. 4A). If the BIF is supported internally the Execute Instruction block 180 causes the CPU to execute the instruction internally. This alternative sequence allows the CPU to execute some complex functions if such functions are not supported in the COP.

In column 600 (FIG. 4C) the MMU first fetches the instruction at 610 and looks for a Memory Ready ? at inquiry block 620. Thereafter, the MMU decodes the instruction at Decode Instruction block 630 and completes Provide BIF Entry Point at 640 onto the entry point line 20 (FIG. 2). Thereafter, the MMU enters Switch To Hold State 660 until commanded by either CPU or COP. In the flow presented, the COP commands the MMU to Take Address at block 670 as provided by the COP at block 460. The MMU performs Fetch/Write Data 680 to the address provided. Thereafter, the MMU looks for a Memory Ready ? condition at 690 and makes a Begin Instruction Fetch ? inquiry at 700. Affirmative conditions allow the MMU to loop back to the start of the column 600 via block 710.

In column 800 (FIG. 4D) memory sequence begins with an Access Memory command at 810 followed by an Activate Memory Ready command at 820. The sequence is repeated each time memory is accessed. In other words, data may be written to memory or read out of memory only when the memory ready line is enabled. For example, when MMU makes its Fetch Instruction Command at block 610 (FIG. 4C), the memory is accessed at 810 and will provide data if it is ready at 820. Whereupon, MMU Decodes Instruction at 630 in response to an affirmative inquiry at 620.

The various sequences described above are employed for implementing a sequence in which control is switched from the CPU to the COP for execution of a BIF, the results of which are thereafter written into memory and provided to the register stack of the CPU in accordance with the teachings of the invention. The sequences described above are exemplary of various possible sequences which may be available dependent upon the specific function supported in the COP. Thus, a flexible coprocessor interface is available as a result of the present invention.

What is claimed is:

1. An interface for switching control of a memory management unit (MMU) between a central processing unit (CPU), including a processor and a register stack, and one or more coprocessors (COP), each coprocessor including a processor and a register stack, wherein a memory retrievably stores information in selected address locations for use by the CPU and the MMU and is normally responsive to the CPU for controlling the exchange of information between the memory and the CPU, each COP is operative when enabled to perform predetermined functions not normally performed by the CPU utilizing information in the memory, the interface comprising:

means responsive to the register stack of the CPU or COP currently in control for updating the register stacks in the CPU or COP not currently in control, with current changes in the register stack of the CPU or COP currently in control, such that, each register stack has currently stored therein information sufficient to allow any of said CPU or COP to immediately assume control of the MMU in response to a command without reloading the register stacks with current information;

means for enabling any one of the CPU or COP processors to control the MMU immediately in response to prefetch commands produced by the CPU or COP processor currently in control; and means for passing control between the CPU and COP processors in response to executed instructions.

2. The interface described in claim 1 wherein the means for updating the register stack comprises:

coprocessor address bus means, coprocessor write bus means and coprocessor data bus means interconnecting the CPU and COP register stacks, said coprocessor write bus means for enabling the register stacks of the CPU or COP not currently, in control, to receive information in the register stack of the CPU or COP currently in control, the coprocessor address bus means for locating the information in a selected address in the register stacks of the CPU or COP into currently in control and the coprocessor data bus means for carrying the information from the register stack of the CPU or COP currently in control to the register stacks of the CPU or COP not currently in control.

3. The interface described in claim 2 wherein each CPU and COP register stack includes a plurality of registers formed in a multi-port configuration.

4. The interface described in claim 3 comprising means for coupling the CPU and COP register stacks to the coprocessor data bus.

5. The interface described in claim 4 wherein the means for enabling any one of the CPU or COP processors to control the MMU further comprises an entry point signal produced by the MMU preceding a prefetch command.

6. The interface described in claim 5 wherein the means for passing control between the CPU and COP processors comprises coprocessor flag means coupled between the CPU and each coprocessor, said CPU or COP processor currently in control being responsive to a signal on the coprocessor flag means for determining whether a predetermined function of a CPU or COP processor not currently in control is supported and producing the prefetch command for allowing the CPU or COP processor not currently in control to assume control of the MMU.

7. A method for switching control of a memory management unit (MMU) between processors including a central processing unit (CPU) and one or more coprocessors (COP), wherein a memory retrievably stores information in selected address locations o fuse by the CPU and the MMU is normally responsive to the CPU for controlling an exchange of information between the memory and the CPU and, the one or more coprocessors are operative when enabled to perform predetermined functions not normally performed by the CPU utilizing information in the memory, the method comprising the steps of:

enabling any one of the processors to control the MMU immediately in response to prefetch commands produced by the CPU or COP in control, each CPU and COP having a register stack for storing changeable information;

passing control between the processors in response to executed instructions; and updating the CPU and COP register stacks in accordance with current changes in the register stack of the CPU or COP in control, such that, all register stacks have currently stored therein information sufficient to allow any of said CPU to COP to immediately assume control of the MMU in response to a command without reloading the CPU or COP register stacks with current information.

* * * * *